US009047197B2

(12) United States Patent
Chou

(10) Patent No.: US 9,047,197 B2
(45) Date of Patent: Jun. 2, 2015

(54) NON-COHERENT STORE INSTRUCTION FOR FAST INTER-STRAND DATA COMMUNICATION FOR PROCESSORS WITH WRITE-THROUGH L1 CACHES

(75) Inventor: Yuan C. Chou, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 1596 days.

(21) Appl. No.: 11/877,110

(22) Filed: Oct. 23, 2007

(65) Prior Publication Data

US 2009/0106495 A1    Apr. 23, 2009

(51) Int. Cl.
G06F 9/52      (2006.01)
G06F 12/08     (2006.01)
G06F 9/30      (2006.01)
G06F 9/38      (2006.01)

(52) U.S. Cl.
CPC .... *G06F 12/0842* (2013.01); *G06F 2212/1024* (2013.01); *G06F 9/52* (2013.01); *G06F 12/0804* (2013.01); *G06F 9/3004* (2013.01); *G06F 9/30043* (2013.01); *G06F 9/30047* (2013.01); *G06F 9/3834* (2013.01); *G06F 9/3842* (2013.01); *G06F 9/3851* (2013.01); *G06F 12/0811* (2013.01)

(58) Field of Classification Search
None
See application file for complete search history.

(56) References Cited

U.S. PATENT DOCUMENTS 5,359,723 A * 10/1994 Mathews et al. ............. 711/122
5,826,052 A * 10/1998 Stiles et al. .................. 712/205
6,021,468 A * 2/2000 Arimilli et al. .............. 711/122
6,591,332 B1 * 7/2003 Swanson et al. ............. 711/108
7,475,191 B2 * 1/2009 Guthrie et al. ............... 711/122
2006/0085605 A1 * 4/2006 Guthrie et al. ............... 711/141

OTHER PUBLICATIONS

Sun Microsystems. "OpenSPARC™ T1 Microarchitecture Specification." Aug. 2006. Part No. 219-6650-10. Rev. A. pp. 1-3 through 2-2, 2-21 through 2-32, and 4-1 through 4-17.*
Himanshu Shekhar Sinha. Mermera: Non-Coherent Distributed Shared Memory for Parallel Computing. Apr. 1993. Boston University Computer Science Department. BU-CS-93-005. pp. iv, 20, 24-28.*
Robert S. Chappell, Jared Stark, Sangwook P. Kim, Steven K. Reinhardt, and Yale N. Patt. "Simultaneous Subordinate Microthreading (SSMT)." May 1999. IEEE. ISCA '99.*
David E. Culler and Jaswinder Pal Singh. Parallel Computer Architecture: A Hardware/Software Approach. 1999. Morgan Kaufman. pp. 82-84 and 121-124.*

(Continued)

*Primary Examiner* — Nathan Sadler
(74) *Attorney, Agent, or Firm* — Polsinelli PC

(57) ABSTRACT

A method is disclosed that uses a non-coherent store instruction to reduce inter-thread communication latency between threads sharing a level one write-through cache. When a thread executes the non-coherent store instruction, the level one cache is immediately updated with the data value. The data value is immediately available to another thread sharing the level-one write-through cache. A computer system having reduced inter-thread communication latency is disclosed. The computer system includes a first plurality of processor cores, each processor core including a second plurality of processing engines sharing a level one write-through cache. The level one caches are connected to a level two cache via a crossbar switch. The computer system further implements a non-coherent store instruction that updates a data value in the level one cache prior to updating the corresponding data value in the level two cache.

18 Claims, 6 Drawing Sheets

(56) References Cited

OTHER PUBLICATIONS

Norman P. Jouppi. "Cache Write Policies and Performance." 1993. IEEE. ISCA '93.*

Sun Microsystems. "UltraSPARC Architecture 2005." Jun. 2006. Revision Draft D0.8.8. pp. 21-22.*

Jaehyuk Huh, Jichuan Chang, Doug Burger, and Gurindar S. Sohi. "Coherence Decoupling: Making Use of Incoherence." Oct. 2004. ACM. ASPLOS '04.*

Basem A. Nayfeh, Lance Hammond and Kunle Olukotun. "Evaluation of Design Alternatives for a Multiprocessor Microprocessor." May 1996. ACM. ISCA '96.*

David L. Weaver and Tom Germond. The SPARC Architecture Manual. 1994. Prentice-Hall. Version 9. Appendix K.*

Satish Chandra and James R. Larus. "Optimizing Communication in HPF Programs on Fine-Grain Distributed Shared Memory." 1997. ACM. PPoPP '97.*

David Tam, Reza Azimi, and Michael Stumm. "Thread Clustering: Sharing-Aware Scheduling on SMP-CMP-SMT Multiprocessors." Mar. 2007. ACM. EuroSys '07.*

"POWER5 Architecture." Feb. 2006. IBM. http://www.ibm.com/developerworks/wikis/display/WikiPtype/POWER5+Architecture.*

Author Unknown, "CPU Cache", http://en.wikipedia.org/wiki/CPU_cache, 15 pages, at least as early as Feb. 2007.

Vance, Ashlee, "Sun's Rock goes 16 cores and arrives with multi-core friends", http://www.theregister.co.uk/2006/03/14/sun_rock_deets/print.html, 4 pages, at least as early as Feb. 2007.

* cited by examiner

NON-COHERENT STORE INSTRUCTION FOR FAST INTER-STRAND DATA COMMUNICATION FOR PROCESSORS WITH WRITE-THROUGH L1 CACHES

FIELD OF THE INVENTION

Aspects of the present invention relate to multi-strand processor computer systems. More particularly, aspects of the present invention relate to inter-strand data communication via a shared level one data cache.

BACKGROUND

Modern high performance processors typically have multiple levels of cache memory (a cache hierarchy) that store instructions and data. Each level of the cache generally has a certain latency, the time between when a request is issued to the cache and when a response is received, with the primary or level one (L1) cache having lower latency than the secondary or level two (L2) cache. Maintaining low latency in the cache system generally is important to prevent a processor stall (i.e., the processor becoming idle) when accessing the cache system for data and/or instructions.

A high performance processor may support multiple threads of execution. Generally speaking, a "thread" is a separate execution context with its own instructions and data. A thread executing on a multi-threaded processor may need to communicate data with another thread that is concurrently executing on the same or different processor. Currently, this communication may occur through the data cache hierarchy. The sending thread stores the data value in the cache and the receiving thread loads it from the cache. On processors with a write-through L1 cache, the sending thread generally has to write (commit) the data to the L2 cache before writing the data to the L1 cache to maintain data consistency. As a result, the inter-thread communication generally incurs a minimum communication latency that is approximately the L2 cache latency (incurred by the sending thread writing the value to the L2 cache) plus the L1 cache latency (incurred by the receiving thread reading the value from the L1 cache).

What is needed is a way to achieve faster inter-thread communication between threads sharing a L1 write-through cache. Faster inter-thread communication may be desirable in many scenarios. For example, faster communication between the architectural (main) thread and speculative threads may reduce overhead associated with transactional speculation, enabling the speculation to be profitable in more situations. Faster inter-thread communication may also be useful in the context of software scouting where a scouting thread performing optimizations on behalf of a main thread communicates with the main thread.

SUMMARY

One aspect of the present invention involves a method for reducing inter-thread communication latency in a multiprocessor system having a cache hierarchy with a write-through level one cache. The method involves providing a non-coherent store instruction, scheduling a first thread on a hardware context associated with the write-through level one cache and scheduling a second thread on another hardware context that shares the write-through level one cache. The first thread executes the non-coherent store instruction to pass a data value to the second thread.

Another aspect of the present invention involves a computer system having reduced inter-thread communication latency. The computer system includes a first plurality of processor cores, a crossbar switch and a level two cache operably coupled to the crossbar switch. Each processor core includes a second plurality of processing engines and a write-through level one cache operably coupled to each of the processing engines and operably coupled to the crossbar switch. The computer system further implements a non-coherent store instruction that when executed updates a data value in the level one cache prior to updating a corresponding data value in the level two cache.

DETAILED DESCRIPTION OF EMBODIMENTS OF THE INVENTION

One aspect of the present invention utilizes a new variant of a store instruction to reduce inter-thread communication latency of threads sharing a write-through L1 cache. The new store instruction relaxes coherency constraints such that the store becomes visible to the threads sharing the L1 cache prior to other threads executing on hardware contexts not sharing the L1 cache. That is, not all threads are guaranteed to see the store in the same order relative to other memory operations.

Figure 1:
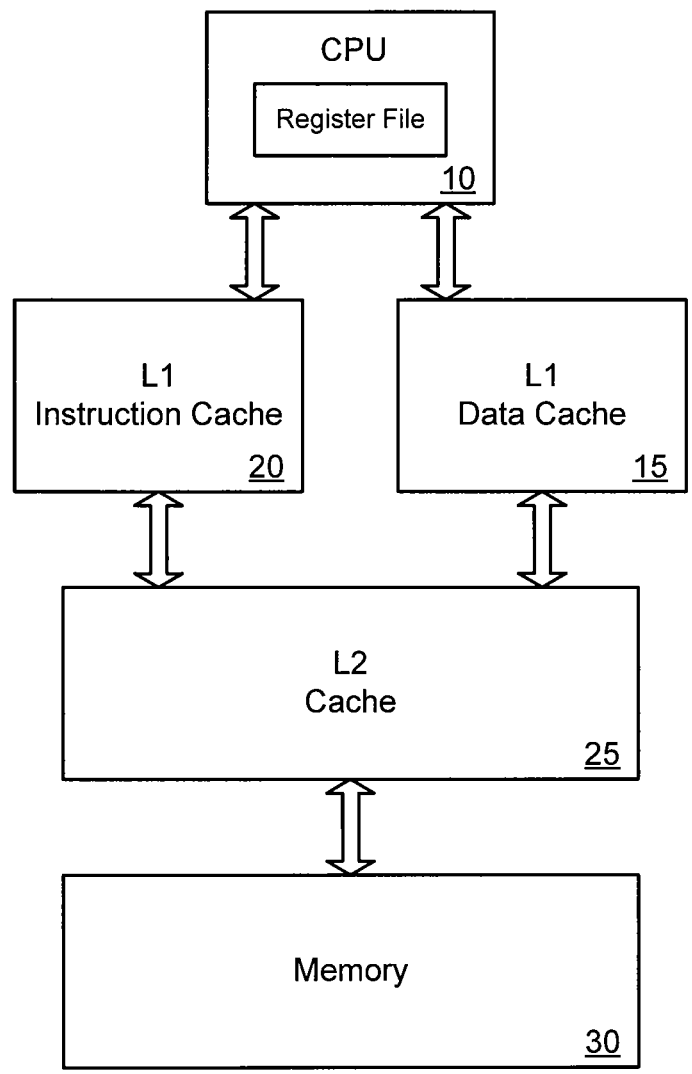
FIG. 1 depicts a processor and a hierarchical cache having a L1 instruction cache, a L1 data cache and a L2 cache.

FIG. 1 depicts a microprocessor 10 and a hierarchical cache that includes a L1 data cache 15, a L1 instruction cache 20 and a L2 cache 25. The hierarchical cache is in communication with a main memory 30. In such a hierarchical cache having two levels of cache, a block of data resident in one cache level of the cache hierarchy generally has a copy of the data block resident elsewhere in the cache hierarchy and/or main memory. When the processor writes a cache block, some mechanism typically exists to update all copies of the data block so that the effects of the write persist beyond the time that the block resides in the cache. Each level of the cache may employ a write-through cache or a writeback cache to propagate the writes to the next level of cache in the cache hierarchy. A write-through cache propagates each write to the next level when the write occurs. A writeback cache, on the other hand, delays updating other copies of the data block until required (e.g., when a dirty cache line is evicted) because this decreases latency at the expense of increased cache complexity necessary to locate the most up-to-date copy of the data block.

In a write-through L1 cache all writes to the L1 cache generally are propagated to the L2 cache such that the L2 cache has the latest copy of the data block. Use of a writeback L1 cache in a multichip system is complicated because it may be the only cache with the latest copy of a data block. Thus, when another processor requests a copy of that data block, the L1 cache has to provide it. In contrast, in a write-through L1 cache, only the L2 cache needs to be searched to locate the latest copy of the data block.

With a write-through L1 cache, sufficient bandwidth should be made available between the L1 and L2 caches to accommodate the increased write traffic. Modern processors generally include a L1 cache and a L2 cache on the processor chip. This makes it relatively easy to provide adequate bandwidth for the write-through traffic. The write-through L1 cache design may be simpler to implement than a writeback L1 cache design because a write-through L1 cache generally does not serve as the sole repository for the most up-to-date copy of a cache block and does not have to initiate writebacks when dirty blocks are evicted from it.

Writeback caches may be employed at lower levels of the cache hierarchy. A writeback cache generates less write traffic to the next level of cache, requiring less communications bandwidth. Communications bandwidth may be a concern when propagating write traffic off the processor chip. Therefore, L2 caches are typically writeback.

Figure 2:
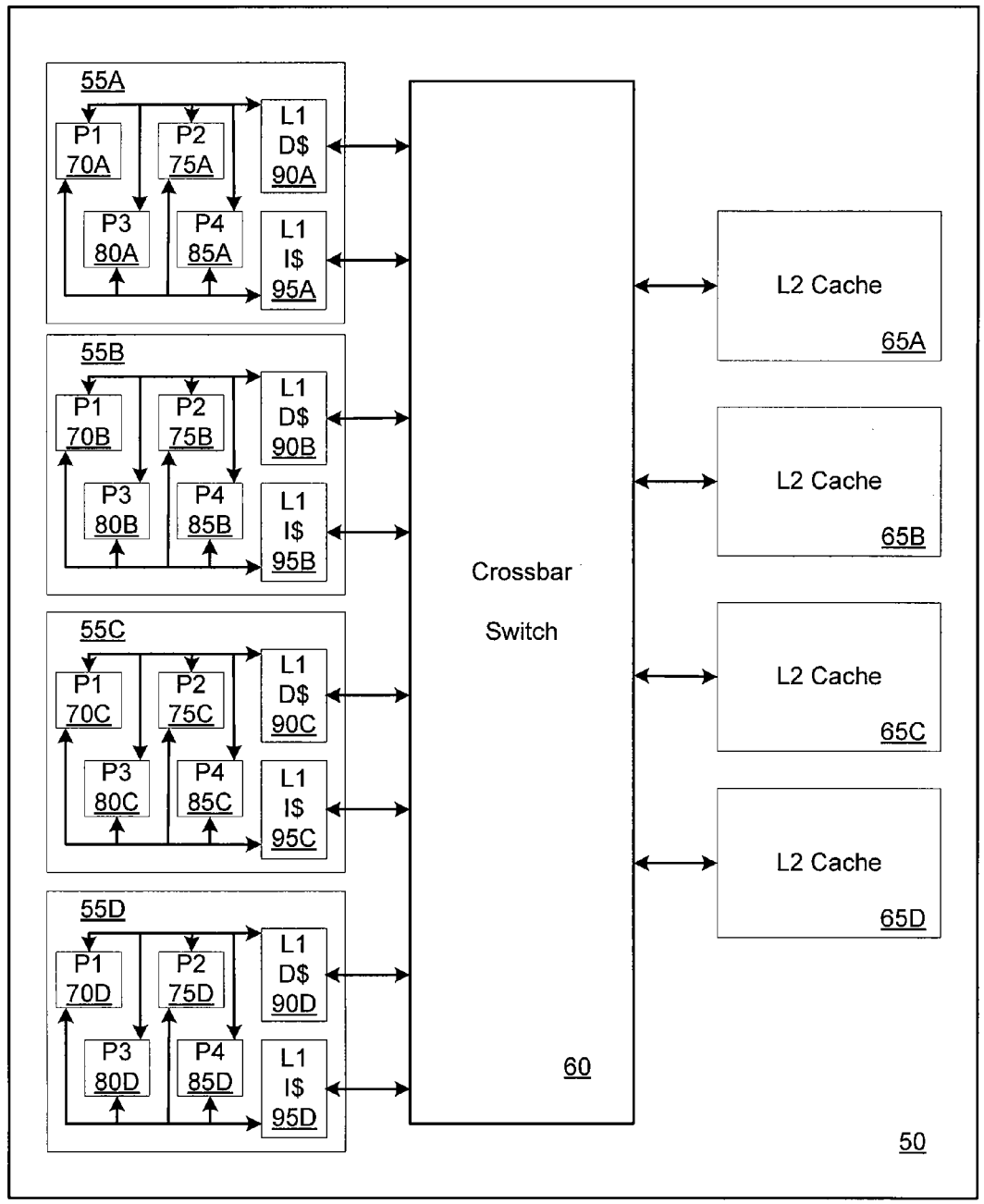
FIG. 2 depicts a processor with four cores, a crossbar switch and four L2 caches. Each core has four processing engines that share a L1 data cache and a L1 instruction cache.

FIG. 2 depicts a cache hierarchy for a processor chip 50 that may have four processor cores, 55A-D, a crossbar switch 60 and four L2 caches 65A-D that may be shared by the processor cores. Other processor chips may have more or fewer L2 caches. Each processor core may have four processing engines, 70A-D, 75A-D, 80A-D, 85A-D, respectively, a shared L1 data cache 90A-D, respectively and a shared L1 instruction cache 95A-D, respectively. The crossbar switch 60 may be used to interconnect the L1 data cache 90 and L1 instruction cache 95 of each processor core with the four shared L2 caches 65A-D. Each processing engine may support two threads. Other processor chips may have more or fewer processor cores, each processor core may have more or fewer processing engines and each processing engine may support more or fewer threads. Additionally, the processor engines may or may not share a L1 data cache and/or a L1 instruction cache.

The cache hierarchy depicted in FIG. 2 may employ L1 write-through caches and L2 writeback caches. When a process or thread performs a store operation, before committing the store, the L1 cache should not be updated before the L2 cache is updated. This is done for memory system coherence. Coherence defines what values can be returned by a read operation. When the L2 cache has the latest copy of the data block to be updated by the store, it should be updated no later than the L1 cache to ensure that any thread performing a read of the data block sees the same value. Thus, an overall communication latency of approximately the L2 cache latency plus the L1 cache latency is incurred before another process or thread sees the data value written by the store operation.

In order for one thread to share data with a second thread, the sending thread generally writes the data out to a L2 cache and then the data is brought into a L1 cache when the receiving thread reads the data. Even if the cache block resides in the L1 cache, it is not updated immediately. Specifically, the cache block generally cannot be updated in the L1 cache until after it is updated in the L2 cache, due to the nature of write-through and writeback caches as set out above. Thus, even if the threads use a flag to synchronize the data values being passed from one thread to the other thread, the communication still incurs the latency of the L2 cache plus the latency of the L1 cache. This is generally a result of the L2 cache being the central point of coherence (where the latest copy of data can be found) when the L1 cache is a write-through cache.

One aspect of the present invention makes use of a new store instruction to reduce inter-thread communication latency when the threads share a write-through L1 cache. The new store instruction is non-coherent. That is, threads running on different cores or chips generally are not guaranteed to see the store in the same order relative to other memory operations. For example, threads running on strands (e.g., hardware contexts) that share the L1 cache may see the store value earlier than threads running on other strands. This store instruction may be used by a thread that communicates a value of one or more of its registers to another thread and coherency is not required because some other form of synchronization is employed, such as using a flag to indicate when the value is ready.

Because of the non-coherence of the new store instruction, a processor executing the new store instruction may write the store value to the L1 cache before making the store's effects globally visible, i.e., before updating the L2 cache (assuming that the L2 cache is the central point of coherence). This has the advantage that any threads sharing the same L1 cache will see the update immediately without incurring the latency of the L2 cache.

Figure 3:
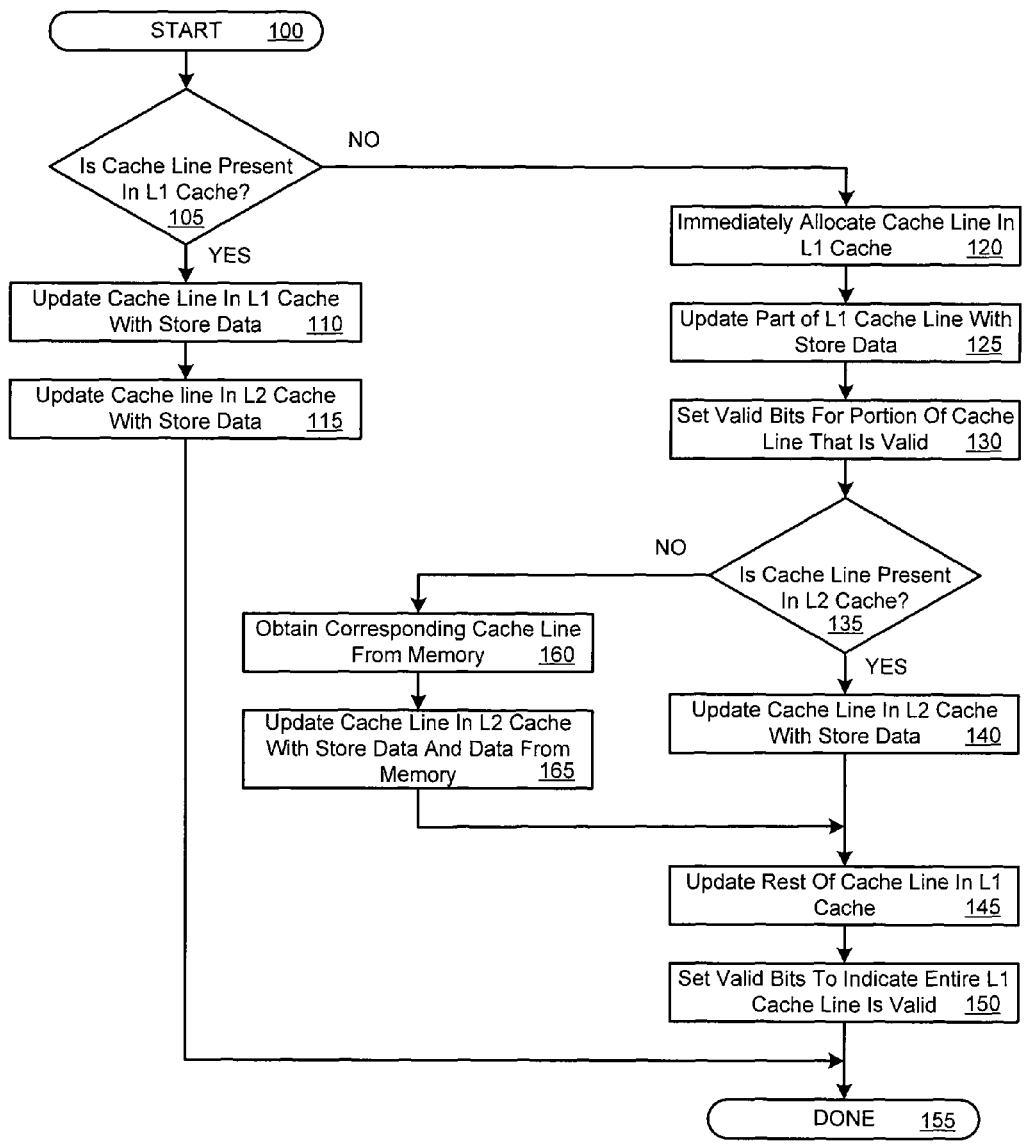
FIG. 3 depicts a flow chart of a new store instruction for one embodiment of the present invention.

FIG. 3 depicts a flow chart of the operations that may be performed by a processor having a write-through L1 cache when writing data using the new store instruction. Initially, operation 100 is executed when the processor updates a data block (cache line) with the store data. Then, operation 105 is executed. Operation 105 determines if the cache line being updated (written) is present in the L1 cache. If the cache line is present in the L1 cache, operation 110 is executed. Operation 110 updates the L1 cache line with the store data. Note that this may be all or a portion of the cache line depending on the amount of store data being written. Then, operation 115 is executed. Operation 115 updates the corresponding cache line in the L2 cache with the store data (note that with a write-through L1 cache design, any cache line present in the L1 cache is present in the L2 cache). Again, this may be all or a portion of the cache line. Then, operation 155 is executed.

If operation 105 determines that the cache line is not present in the L1 cache, operation 120 is executed. Operation 120 immediately allocates the cache line in the L1 cache. Then, operation 125 is executed. Operation 125 updates part of the allocated cache line with the store data. Then, operation 130 may be executed (depending on whether partial cache line writes are allowed). Operation 130 sets one or more valid bits to indicate the corresponding portion of the allocated L1 cache line containing valid data when only a portion of the allocated cache line is updated. Then, operation 135 is executed.

Operation 135 determines of the cache line is present in the L2 cache. If the cache line is present in the L2 cache, operation 140 is executed. Operation 140 updates the corresponding cache line in the L2 cache with the store data. Then, operation 145 is executed. Operation 145 updates the rest (i.e., any invalid portion) of the L1 cache line. Then, operation 150 is executed. Operation 150 sets all of the valid bits to indicate that the entire L1 cache line is valid. Then, operation 155 is executed.

If operation 135 determines that the cache line is not present in the L2 cache, operation 160 is executed. Operation 160 obtains (fetches) the corresponding cache line (data block) from memory. This may be from a higher level cache in the cache hierarchy or from main memory, depending on the particular cache hierarchy implementation. Then, operation 165 is executed. Operation 165 updates the cache line in the L2 cache with the store data and uses data from memory to update any portion of the cache line not updated with store data. Then, operation 145 is executed.

More particularly, in a processor with a write-through L1 cache, if the cache line (data block) is present in the L1 cache, the processor may immediately update the cache line and continue on. If the cache line is not present in the L1 cache, the processor may immediately allocate the cache line in the L1 cache and write the store value into the cache line. Some embodiments of the present invention may use a set of valid bits to indicate which portions of the cache line have valid data and which portions are invalid, waiting for data to be brought in. If the cache line is present in the L2 cache, the processor generally updates the line in the L2 cache. If the line is not present in the L2 cache, the processor generally allocates the line in the L2 cache. In either case, the processor may update the write-through L1 cache and then, at a later time, update the L2 cache and the rest of the L1 cache line when the data is returned for a cache miss. Only the portion of the cache line written to the L1 cache becomes visible early to other threads sharing the L1 cache.

Additionally, when the store instruction is executed by a processor, data can be written into the L1 cache without waiting for the L2 cache to acquire write permission (obtain ownership) of the cache line and without having to wait for the cache line to be brought into the L2 cache if the cache line is not present in the L2 cache. Thus, use of the new store instruction generally reduces the communication latency between two strands sharing the same L1 cache to about twice the L1 cache latency (the sending thread writes the data to the L1 cache and the receiving thread reads the data from the L1 cache). A store instruction conforming to aspects of the invention thus may provide improved performance during transactional speculation and/or software scouting as described in more detail below.

In a particular implementation, hardware is used to write stores in order when a processor uses the new store instruction to write data to the L1 cache (i.e., the writes occur immediately). However, there may be no guarantee on the commit order of the stores to the L2 cache. This generally means that even if a sending thread uses a flag that may be written to the L1 cache to indicate that all data being sent is ready, the flag value could be committed before all the data is committed. Thus, this new store instruction generally should not be used to perform lock-free synchronization or be used to share data among threads that do not share the same L1 cache.

Transactional speculation may occur within a program, for example, when a program loop is broken up such that individual iterations of the loop execute in parallel on separate threads. The first iteration of the loop generally is not speculative and is executed on a first thread. However, the second iteration of the loop executed in parallel on a second thread may be speculative because the second thread may use some data values prematurely. That is, the second thread may use data values supplied by the first thread to begin executing before the first thread completes execution. Should the first iteration fail, the results from the second thread generally have to be flushed. Before the second thread can begin executing its loop iteration, data values (called live-in values) generally have to be passed to the second thread. The conventional way of passing data values from one thread to another is generally done by the sending thread writing one or more of its register file values to memory using standard store instructions and then setting a flag, again using a standard store instruction to write the flag value to memory, to indicate that the register file values are available. The receiving thread generally spins on the flag until it changes and then reads (copies) the one or more register file values from memory into its own register file.

During transactional speculation, the execution of conventional store instructions by a processor with a write-through L1 cache causes the sending thread to store each register value to the L2 cache before the next register value can be stored. This may increase the latency incurred by the receiving thread due to increased start-up costs incurred to initialize any register data values.

Transactional speculation may be worthwhile under circumstances when start-up costs associated with launching a speculative thread are reduced. A compiler may analyze a program and modify the program to optimize any transactional speculation within the program. The compiler may perform the optimization by substituting the new store instruction when it detects a situation where one thread wishes to communicate register values to another thread and the two threads share the same L1 cache. Use of the new store instruction enables the sending thread to write the data values in order directly to the L1 cache. As discussed above for threads using a conventional store command to communicate data to each other, the sending thread may synchronize the communication (indicate when the data is available) using a flag. The sending thread sets a flag (writes the flag to the L1 cache) after all the data has been written to the L1 cache. The receiving thread spins on the flag, e.g., executes a load of the flag in a tight loop waiting for the flag to change. When the flag changes, the register data from the sending thread is available to be read by the receiving thread. This reduces the communication latency between the two threads. By enabling the speculative thread to begin executing in parallel with the main thread sooner, it can begin doing work sooner. That is, the new store instruction may be used to decrease the start-up costs associated with the speculative thread. This reduced inter-strand communication overhead allows the transactional speculation to be worthwhile for shorter sequences of instructions.

It should be noted that the above described inter-strand communication mechanism is a unidirectional communication mechanism. Bi-directional inter-strand communication may be accomplished by using the unidirectional communication mechanism for each direction of communication. Further, any strand seeking to communicate more quickly with another strand sharing the same L1 cache could implement a similar mechanism.

The new store instruction may also be beneficial for software scouting. In software scouting, a speculative thread may be used to prefetch data and/or instructions that may be used by the main thread. The speculative thread does not touch the architectural state of the processor. In this situation, the speculative thread needs some data values from the main thread before beginning execution. These may include live-in values needed to compute the addresses for any prefetches. The speculative thread generally runs on its own strand (hardware context having its own register set). When the speculative thread is launched, its registers contain invalid values. These registers may be initialized by obtaining proper values from the main thread. Thus, the new store instruction may be used to initialize the registers of the speculative thread so that it may more quickly begin execution and speculatively prefetching loads. It should be noted that the new store instruction may also be used to speed up communication of results from the speculative thread back to the main thread.

To further reduce inter-strand communication latency, some embodiments of the present invention may employ a plurality of valid bits for each cache line in the L1 cache. Generally, each level of cache contains a subset of all the information contained in processor memory, whether L1, L2 or otherwise. Thus, each level of cache has some low latency mechanism, such as a lookup, to check whether or not a particular data block is cache-resident. Various lookup techniques may be employed depending on how the cache is organized and the block size of the cache. Data block size (or cache line size) generally refers to the granularity at which the cache operates. Each data block contains a contiguous series of bytes of memory. When the data block size is greater than one byte, a lookup may use the low-order bits of an address to find the byte or word being accessed within the data block (the block offset). The lookup may then use the remaining high order bits to identify the location of the data block in the cache memory.

Figure 4:
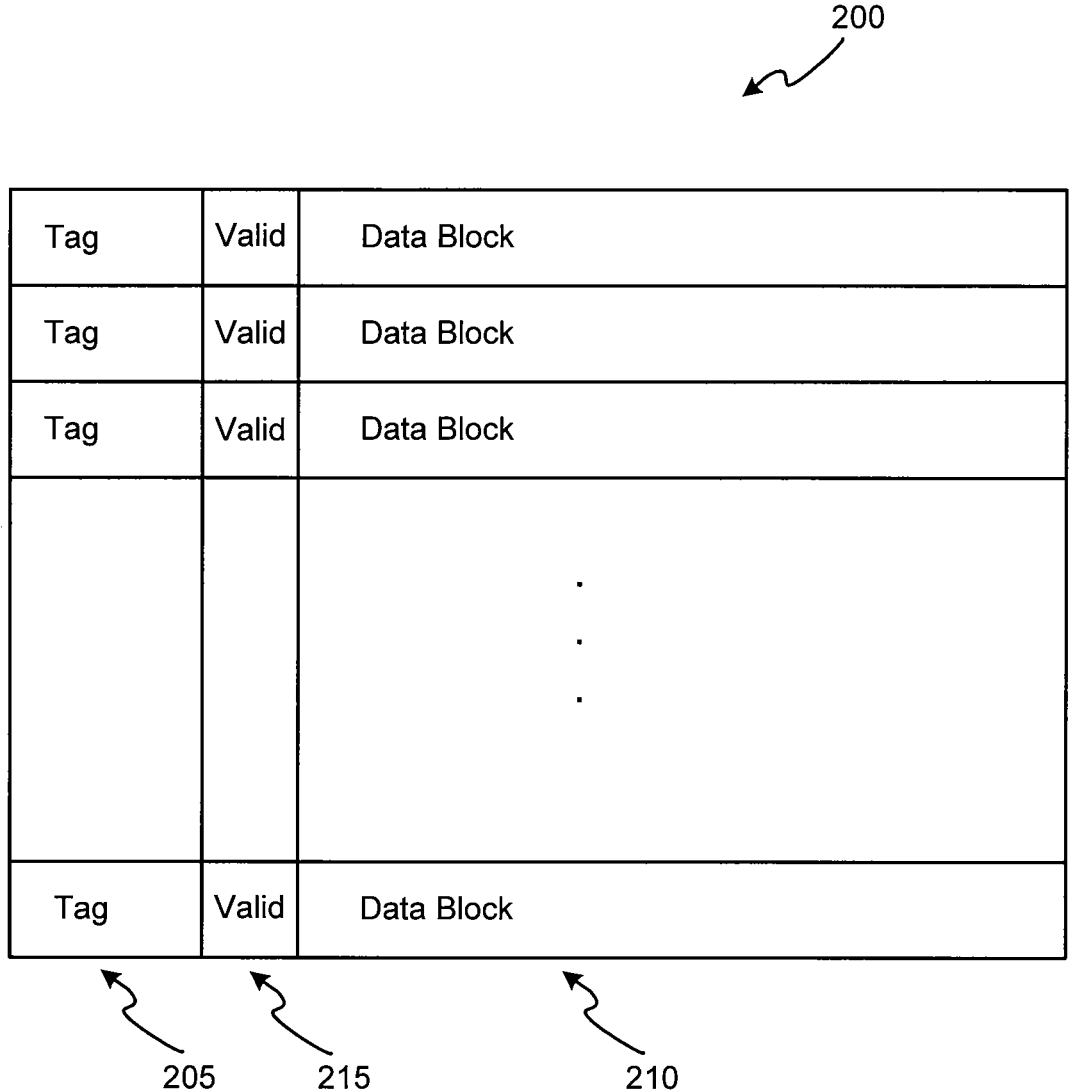
FIG. 4 depicts a direct mapped cache having a tag address and a valid bit associated with each data block.

Cache organization determines how data blocks are arranged in a cache containing multiple data blocks. For example, a cache may be direct-mapped, fully associative or set-associative. One particular type of cache is illustrated to avoid confusion and aid in understanding aspects of the present invention. To determine if the desired information is present in a L1 cache that is direct mapped, the cache 200 may have an address tag 205 associated with each cache block 210 resident in the cache, as depicted in FIG. 4. When the processor desires to read or write a block of data to the cache, the memory address provided by the processor is compared with each tag address to determine if a match is found. That is, the high order address bits provided by the processor are compared with the block address of each tag address. If a match is found, the cache contains the data block (a cache hit). Otherwise the data block is not resident in the cache (a cache miss). A valid bit 215 is also generally associated with each tag address to indicate if there is a valid address associated with the entry (i.e., the block is valid).

Figure 5:
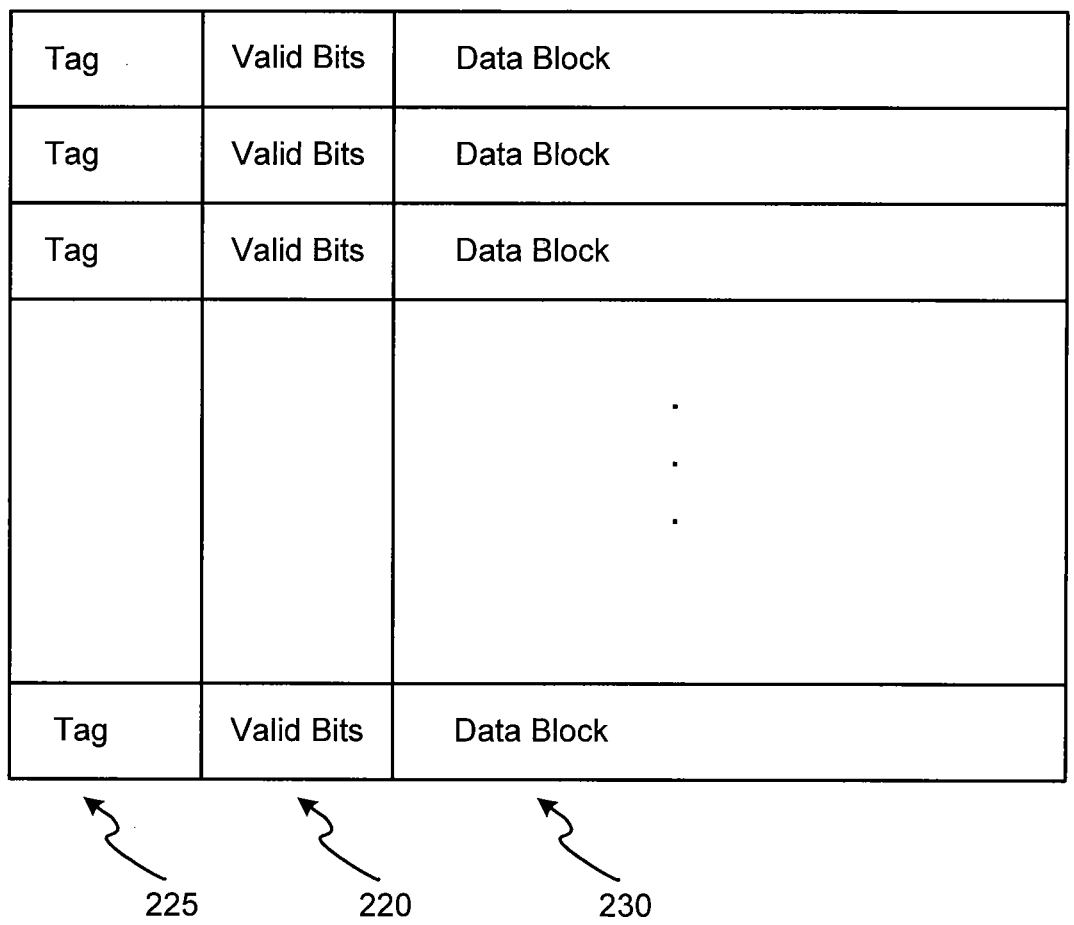
FIG. 5 depicts a direct mapped cache having multiple valid bits for each data block contained in the cache.
Figure 6:
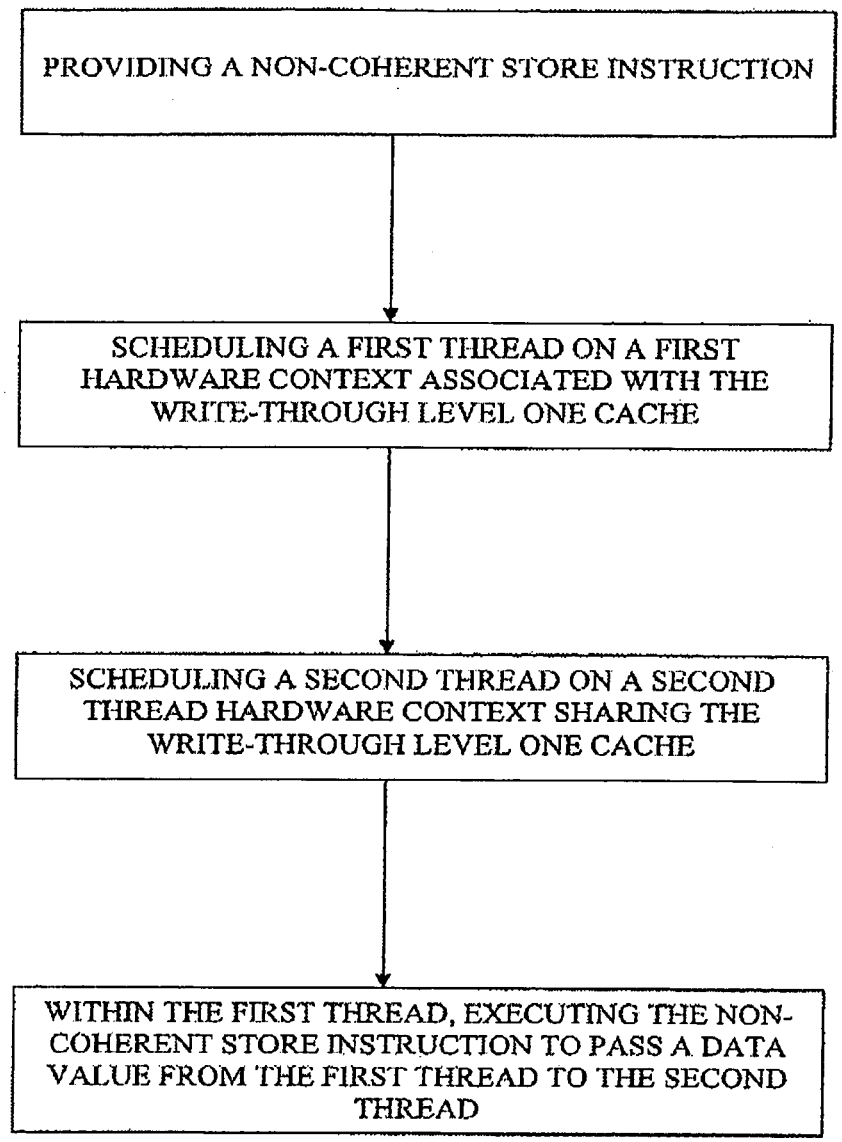
FIG. 6 depicts a method for reducing inter-thread communication latency in a multiprocessor system having a cache hierarchy with a write-through level one cache

Because a cache block may contain multiple bytes of data, one embodiment of the present invention may associate a plurality of valid bits 220 with each cache tag 225 as depicted in FIG. 5. These valid bits allow the processor to read or write a portion of the data block 230 to the L1 cache where the valid bits 220 indicate which portions of the data block 230 are valid. In one particular implementation, a valid bit is associated with each byte of the data block, e.g., for a 64 byte cache block size, there would be 64 valid bits associated with each block. Other implementations may use more or fewer valid bits per cache block depending on the block size and granularity desired within a block.

The valid bits may be used as follows to reduce inter-strand communication latency. Suppose a thread desires to write a data value to a data block that is not resident in the L1 cache. Rather than having to wait for the data block to be brought into the L1 cache before the data block can be updated, the thread may write the data value to the L1 cache data block immediately and set the appropriate valid bit(s) to indicate which portion of the block is valid. When the rest of the data block is brought into the L1 cache, only the invalid portion of the data block gets updated. Further, the portion of the block written may be immediately visible to other strands that share the same write-through L1 cache. The other strands may use the valid bits to determine those portions of the cache line having data ready. That is, a sending thread may update a portion of the L1 cache line (a byte, a word, etc.) and the effects can be seen by the receiving thread without having to bring the block into the L1 cache prior to the update.

As discussed above, the new store instruction can be used by strands (or threads) that share a L1 cache to reduce communication latency between the strands. Thus, referring back to FIG. 2, when each processing engine supports two threads, up to 8 strands may communicate with one another via a shared L1 cache. Generally, two processes or threads that communicate with one another may use processor binding to ensure that they are associated with a particular hardware context group that shares a L1 cache. This allows the operating system scheduler to ensure that the threads are scheduled on strands that share the L1 cache.

The described invention may be provided as a computer program product, or software, that may include a computer readable storage medium having stored thereon computer-executable instructions, which when executed by a computer system (or other electronic devices) perform a process according to the present invention. The computer readable storage medium may include, but is not limited to, magnetic storage medium (e.g., floppy diskette); optical storage medium (e.g., CD-ROM and DVD); magneto-optical storage medium; read only memory (ROM); random access memory (RAM); erasable programmable memory (e.g., EPROM and EEPROM); flash memory; or other type of medium suitable for storing electronic instructions.

Embodiments of the present invention may employ various types of write-through L1 cache including a L1 cache that is direct mapped, set associative or fully associative. Further, various sizes of L1 cache data blocks may be employed by embodiments of the invention. Other embodiments of the invention may use a cache tag having multiple valid bits to provide finer granularity to enable updates to a portion of a cache block. Yet other embodiments may omit or add operations to the methods and processes disclosed herein. Accordingly, the proper scope of the present invention is defined by the claims herein

What is claimed is:

1. A method for reducing inter-thread communication latency in a multiprocessor system having a cache hierarchy with a write-through level one cache, the method comprising:
   providing a non-coherent store instruction;
   scheduling a first thread on a first hardware context associated with the write-through level one cache;
   scheduling a second thread on a second hardware context sharing the write-through level one cache;
   within the first thread, executing the non-coherent store instruction to pass a data value from the first thread to the second thread; and
   updating the shared write-through level one cache prior to updating a cache level at which a cache coherency policy is enforced such that the data value is passed from the first thread to the second thread before the data value is updated in the cache level at which the cache coherency policy is enforced.

2. The method of claim 1, wherein executing the non-coherent store instruction comprises:
   determining whether the data value is stored in a cache line resident in the write-through level one cache;
   when the cache line is resident in the write-through level one cache, updating the cache line with the data value; and
   when the cache line is not resident in the write-through level one cache, immediately allocating the cache line in the level one cache and updating the allocated cache line with the data value.

3. The method of claim 2, further comprising:
   when the cache line is not present in the level one cache, determining whether the cache line is present in a level two cache;
   when the cache line is present in the level two cache, updating the level two cache with the data value; and
   when the cache line is not present in the level two cache, obtaining the cache line from a memory.

4. The method of claim 3, further comprising:
when the cache line is not present in the level two cache, updating the level two cache line with the data value when the cache line is returned from memory.

5. The method of claim 2, wherein updating the allocated cache line with the data value comprises:
updating a portion of the cache line with the data value; and
setting at least one valid bit to indicate the portion of the cache line containing the data value.

6. The method of claim 1, wherein the cache level at which the cache coherency policy is enforced is a level two cache.

7. The method of claim 1, further comprising:
setting a flag to indicate when the data value being passed is valid.

8. The method of claim 1, further comprising:
providing a plurality of valid bits for a cache line containing the data value, each valid bit associated with a portion of the cache line; and
setting at least one of the plurality of valid bits to indicate the portion of the cache line containing the data value.

9. The method of claim 8, wherein each of the plurality of valid bits corresponds to a byte of the cache line.

10. The method of claim 9, further comprising:
determining if the cache line being written is resident in the level one cache; and
when the cache line is not resident, fetching the cache line to update an invalid portion of the cache line.

11. The method of claim 1, wherein the scheduling operations are performed by a compiler.

12. The method of claim 1, wherein the first thread is a main thread of execution and the second thread prefetches the data value for the first thread.

13. The method of claim 12, wherein the data value is a live-in value for computing a prefetch address of the data value.

14. The method of claim 1, wherein the first thread executes a first iteration of a program loop and the second thread executes a second iteration of the program loop in parallel with the first iteration.

15. A computer readable storage medium containing computer-executable instructions which, when executed, perform the method of claim 1.

16. A computer system having reduced inter-thread communication latency, the computer system comprising:
a first plurality of processor cores, each processor core comprising:
a second plurality of processing engines;
a write-through level one cache operably coupled to each of the second plurality of processing engines;
a crossbar switch operably coupled to each write-through level one cache;
a level two cache operably coupled to the crossbar switch; and
wherein the computer system implements a non-coherent store instruction that when executed updates a data value in the level-one cache prior to updating a corresponding data value in the level-two cache such that the data value is passed from a first thread to a second thread before the data value is updated in the level-two cache.

17. The computer system of claim 16, wherein executing the non-coherent store instruction comprises:
determining whether the data value is stored in a cache line resident in the write-through level one cache;
when the cache line is resident in the write-through level one cache, updating the cache line with the data value; and
when the cache line is not resident in the write-through level one cache, immediately allocating the cache line in the level one cache and updating the allocated cache line with the data value.

18. The computer system of claim 17, further comprising:
when the cache line is not present in the level one cache, determining whether the cache line is present in the level two cache;
when the cache line is present in the level two cache, updating the level two cache with the data value; and
when the cache line is not present in the level two cache, obtaining the cache line from a memory.

* * * * *

UNITED STATES PATENT AND TRADEMARK OFFICE
CERTIFICATE OF CORRECTION

| | |
|---|---|
| PATENT NO. | : 9,047,197 B2 |
| APPLICATION NO. | : 11/877110 |
| DATED | : June 2, 2015 |
| INVENTOR(S) | : Chou |

Page 1 of 1

It is certified that error appears in the above-identified patent and that said Letters Patent is hereby corrected as shown below:

In the specification,
In column 2, line 28, delete "cache" and insert -- cache. --, therefor.

Signed and Sealed this
Ninth Day of February, 2016

Michelle K. Lee
*Director of the United States Patent and Trademark Office*